March 10, 1970 — D. G. SCOTT ET AL — 3,499,507
RAILWAY CAR TRUCK BRAKE APPARATUS AND ADJUSTING MEANS
Filed Oct. 22, 1968 — 3 Sheets-Sheet 1

INVENTOR.
DANIEL G. SCOTT
FRED TEMPLE
BY
*A. A. Steinmiller*
ATTORNEY

March 10, 1970  D. G. SCOTT ET AL  3,499,507
RAILWAY CAR TRUCK BRAKE APPARATUS AND ADJUSTING MEANS
Filed Oct. 22, 1968  3 Sheets-Sheet 2
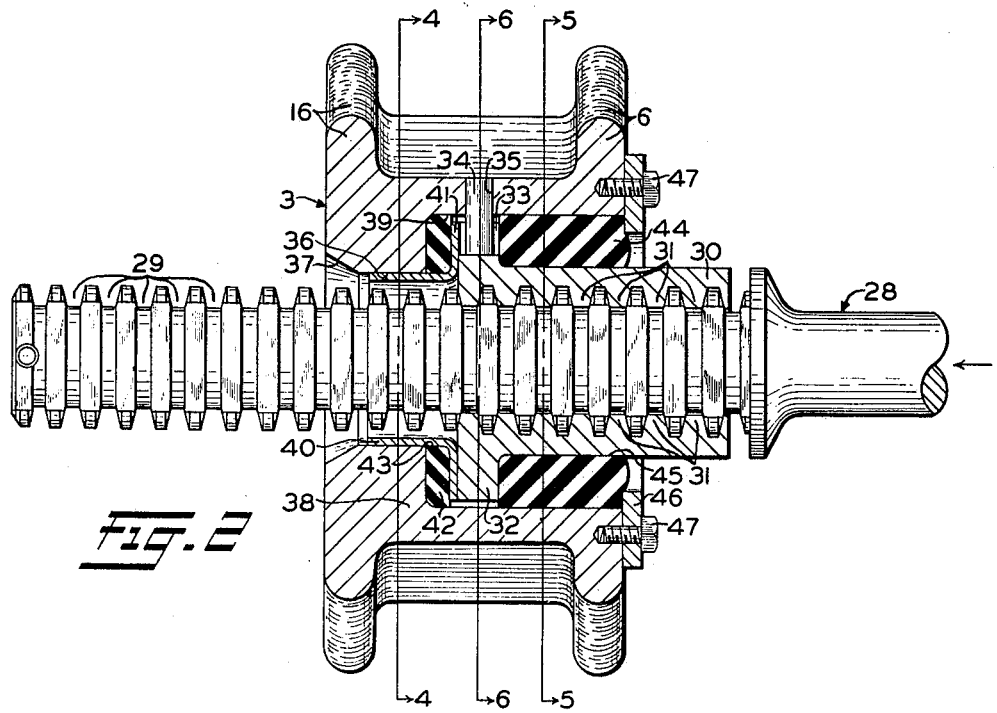
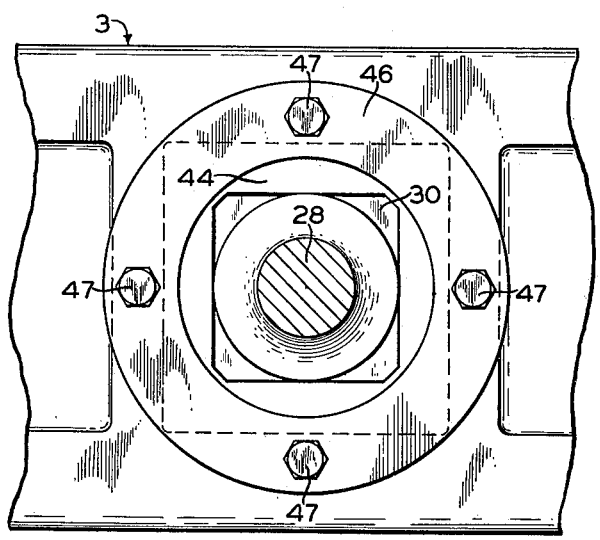
INVENTOR.
DANIEL G. SCOTT
FRED TEMPLE
BY
*A. A. Steinmiller*
ATTORNEY March 10, 1970     D. G. SCOTT ET AL     3,499,507
RAILWAY CAR TRUCK BRAKE APPARATUS AND ADJUSTING MEANS
Filed Oct. 22, 1968     3 Sheets-Sheet 3
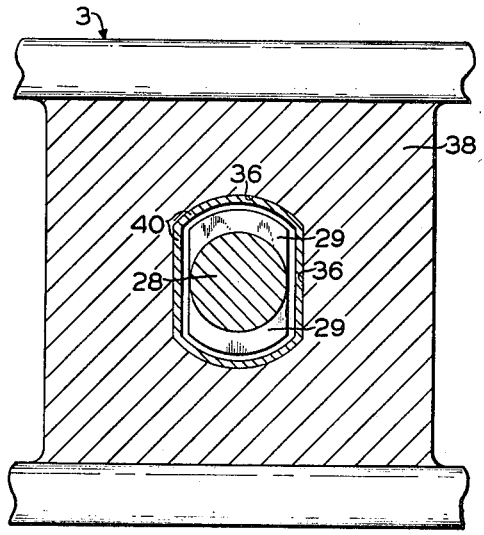
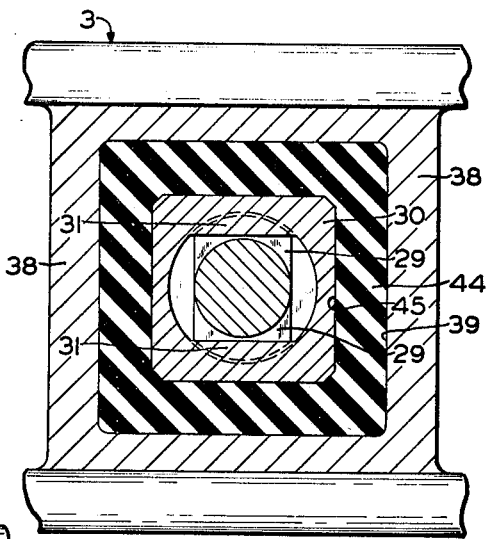
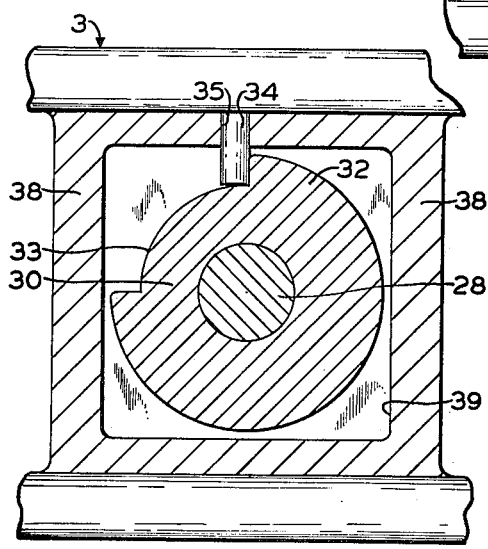
INVENTOR.
DANIEL G. SCOTT
FRED TEMPLE
BY
ATTORNEY United States Patent Office 3,499,507
Patented Mar. 10, 1970

3,499,507
RAILWAY CAR TRUCK BRAKE APPARATUS AND ADJUSTING MEANS
Daniel G. Scott, Apollo, and Fred Temple, Pittsburgh, Pa., assignors to Westinghouse Air Brake Company, Wilmerding, Pa., a corporation of Pennsylvania
Filed Oct. 22, 1968, Ser. No. 769,519
Int. Cl. B61h *13/00;* F16d *65/38, 65/52*
U.S. Cl. 188—52                    11 Claims

ABSTRACT OF THE DISCLOSURE

This invention relates to a railway car truck brake apparatus of the type in which two parallel-extending brakeshoe-carrying brake beams are operated to apply and release the brake shoes to and from the car wheel treads by means of one or more brake cylinders secured to the brake beams. Each cylinder is provided with a diaphragm type piston having a piston rod operatively connected to the other brake beam and embodying therein a manually operative double-acting slack adjuster mechanism that may be operated, upon travel of the diaphragm type piston and piston rod with respect to the cylinder body exceeding a chosen amount incident to effecting a brake application, to increase or decrease the length of the piston rod so as to correspondingly take up slack or increase it.

BACKGROUND OR THE INVENTION

In Patent 3,101,814 issued Aug. 27, 1963 to George K. Newell and assigned to the assignee of the present application, there is shown a single-acting automatic slack adjusting mechanism for a railway car truck brake rigging comprising two parallel-extending brake beams each of which has secured thereto a brake cylinder that is provided with a conventional type of piston having a two-member piston rod that is operatively connected to the other brake beam, this single-acting slack adjuster mechanism is automatically operative to take up slack as the braking surface of a brake shoe wears away to thereby provide a uniform clearance between this braking surface and the tread of the wheel while the brakes are released.

Because the slack-adjuster mechanism described in the above-mentioned Newell patent is single acting, it is unable to effect a let out of slack which is necessary when worn brake shoes are replaced with new shoes or when a worn wheel and axle assembly is replaced with a new assembly having wheels the diameter of which is greater than the diameter of the wheels removed.

Accordingly, it is the general object of this invention to provide a novel manually operative double-acting slack adjuster mechanism so constructed and designed as to be applicable to a brake rigging or apparatus of the type described in the above-mentioned patent and manually operable upon variation in the normal brake shoe clearance as the result of brake shoe wear or the replacement of a worn wheel and axle assembly to take up or let out slack to thereby restore the brake shoe clearance to its normal amount.

SUMMARY OF THE INVENTION

According to the present invention, there is provided a railway car brake apparatus of the type having two parallel-extending brakeshoe-carrying brake beams actuated to brake application and brake release positions by a brake cylinder on each beam provided with a diaphragm type piston and a piston rod operatively connected to the other brake beam. Embodied in each piston rod is a manually operative double-acting slack adjuster mechanism through which a brake-applying force is transmitted from the brake cylinder carried on one brake beam to the other brake beam.

Each slack adjuster mechanism provides a simple and compact means for increasing or decreasing the length of the piston rod between the brake beams whereby to correspondingly take up or let out slack in the brake rigging. The adjuster mechanism comprises essentially a sleeve resiliently secured in an opening through a brake beam by a rubber bushing conforming in contour and interlocked with the opening in the brake beam and with the exterior of the sleeve. The sleeve is provided internally with a succession of spaced chordal ribs which cooperate with a succession of axially spaced grooves along the length of the piston rod. In the normal position of the sleeve the ribs on the sleeve interlock in corresponding grooves on the piston rod to operatively lock the piston rod to the brake beam. When the sleeve is manually rotated through 90° out of its normal position as permitted by the resiliency of the rubber bushing, the ribs on the sleeve disengage from the grooves in the piston rod, thereby permitting the shifting of the piston rod in either direction axially with respect to the sleeve a desired amount. Restoration of the sleeve to its normal position reestablishes the interlocking relation of the ribs on the sleeve with the grooves in the piston rod to lock the piston rod to the brake beam.

In the accompanying drawings:

FIG. 1 is a plan view of a brake rigging for a four-wheel (that is, two-axle) car truck, which rigging embodies a slack adjusting mechanism constructed in accordance with the present invention.

FIG. 2 constitutes a cross-sectional view, on an enlarged scale, taken along the line 2—2 of FIG. 1, and looking in the direction of the arrows, showing the details of construction of a slack adjuster constituting the present invention.

FIG. 3 is a partial end elevational view looking in the direction of the arrow shown in FIG. 2, showing structural details not made apparent in FIG. 2.

FIG. 4 is a vertical cross-sectional view taken along the line 4—4 of FIG. 2 and looking in the direction of the arrows, showing additional details of the slack adjuster.

FIG. 5 is a vertical cross-sectional view, taken along the line 5—5 of FIG. 2 and looking in the direction of the arrows, showing details of the rubber bushing interposed between the piston rod and the brake beam to which it is operatively connected.

FIG. 6 is a vertical cross-sectional view, taken along the line 6—6 of FIG. 2 and looking in the direction of the arrows, showing further details with respect to a rotation-limiting means.

Figure 1:
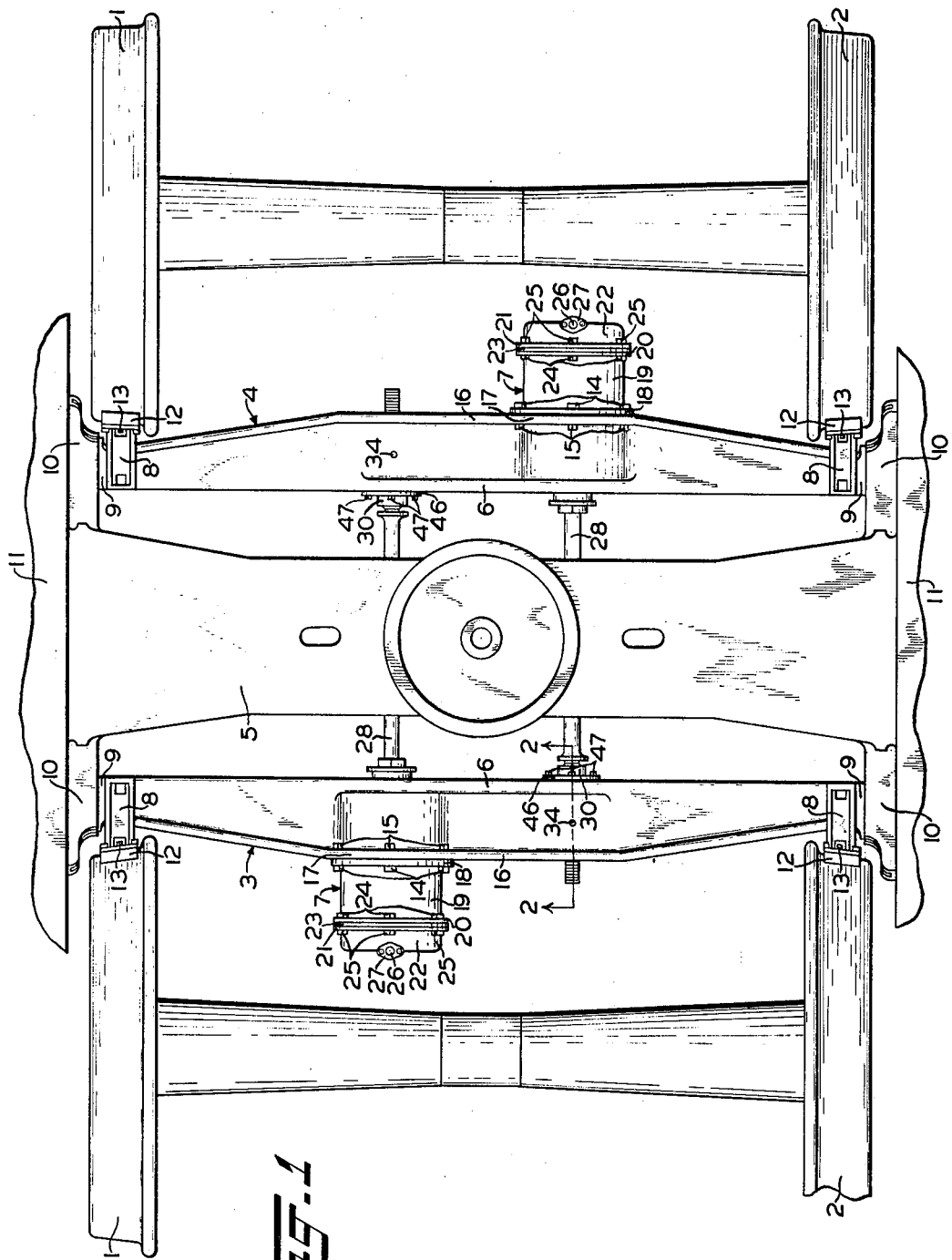

Referring to FIG. 1 of the drawings, reference numerals 1 and 2 designate, respectively, the wheels secured to opposite ends of each of two axles of a two-axle four-wheel railway car truck.

The brake rigging shown in FIG. 1 comprises a pair of cast brake beams 3 and 4 extending crosswise of the car truck and in parallel spaced relation to each other and to a truck bolster 5. The brake beams 3 and 4 are symmetrically arranged on opposite sides of the truck bolster 5 and are movably supported at each end on the side frame members of the truck in a manner hereinafter described.

The brake beams 3 and 4 each, in cross section, have generally the shape of a U-channel with the outer ends of the flanges thereof curved through an angle of substantially 90° to form upper and lower ribs, respectively, the upper rib being designated and shown in FIG. 1 by the reference numeral 6. The brake beams 3 and 4 are constructed, to provide integral therewith a non-pressure head of a brake cylinder 7, which non-pressure head is cast integral with each of the respective brake beams.

As shown in FIG. 1, a brake head 8 is cast integral with each of the brake beams 3 and 4 at each end thereof adjacent to and on the inboard side of one of a pair of guide feed 9 which are also cast integral with each of the respective brake beams at the opposite ends thereof. Each guide foot 9 is a flat generally L-shaped member, the other leg of which is slidably supported in a groove in a wear plate and guide member 10, which is secured to a truck side frame 11. The wear plate and guide members and the guide feet serve to support the brake beams 3 and 4 at the proper height above the rails (that is, somewhat below the horizontal diameter of the wheel), the grooves in the wear plate and guide members 10 being at a slight angle to the horizontal to permit bodily movement of the brake beam in a direction radially of the associated wheels when a brake application is made.

Each brake head carries either a "composition" type or a "cast iron" type of brake shoe 12 for contact with the tread of an associated wheel. In the "composition" type of brake shoe, the material constituting the brake block has a relatively high and uniform friction characteristic as compared to the relatively low and non-uniform characteristic of the "cast iron" type of brake shoe having a brake block of cast iron. In customary manner, each shoe 12 has a backing plate provided with a key bridge to receive a key 13 for removably locking the shoe to the brake head 8.

The brake shoes 12 are operated into and out of contact with the associated wheels 1, 2 by means of the pair of brake cylinders 7 which, as shown in FIG. 1, are respectively secured to the brake beams 3 and 4 by a plurality of bolts 14 and nuts 15. The brake cylinders 7 are symmetrically located on opposite sides of the central longitudinal axis of the car truck, respectively, intermediate the center and one end of the respective brake beams 3 and 4. Since each brake beam 3 and 4 and its one brake cylinder 7 bolted thereto is identical, only the brake beam 3 will be described in detail.

The hereinbefore-mentioned non-pressure head for the respective brake cylinders 7 is cast integral with the U-channel constituting the corresponding brake beam by having the upper and lower flanges thereof elongated or expanded. Likewise, as shown in FIG. 1, on the web side of the U-channel constituting the brake beams 3 and 4 and extending outwardly from the outside faces of the upper and lower flanges thereof a second pair of ribs 16 are elongated or expanded to form bolting flanges 17 to which flanges a flange 18 formed at the non-pressure end of a body 19 of the respective brake cylinder 7 is secured by the bolts 14 which extend through bores (not shown), respectively, in the flanges 17 and 18.

Each brake cylinder body 19 has formed integral therewith at its pressure head end a flange 20 between which and a flange 21 integral with a pressure head 22 is clamped the outer periphery of a movable abutment or diaphragm piston 23 by means of a plurality of bolts 24 and nuts 25. Each diaphragm piston 23 cooperates with its corresponding pressure head 22 to form therebetween a pressure chamber (not shown) to which fluid under pressure may be supplied through a passageway 26 formed in the pressure head 22 which passageway extends upward from this chamber to a flat face 27 formed on the pressure head 22. A flange fitting (not shown) is secured to the flat face 27 by a pair of cap screws (not shown). The flange fitting receives one end of a hose (not shown) the opposite end of which is connected to the brake cylinder pipe leading from the usual brake control valve device (not shown) of the air brake system on railway cars. Fluid under pressure supplied to the pressure chambers in the respective brake cylinders 7 through the corresponding hose, flange fitting and passageway 26 causes movement of the respective brake cylinders and corresponding brake beams on which they are mounted in opposite directions to effect braking contact of the brake shoes 12, carried by the brake beams 3 and 4, with the treads of their respective associated wheels.

Secured by any suitable means to the center of each diaphragm piston 23 is one end of a piston rod 28. Each piston rod 28 extends through a suitable window (not shown) provided in the truck bolster 5 and at its opposite end is releasably locked to the corresponding brake beam in a manner now to be described.

That portion of each piston rod 28 extending inward from its above-mentioned opposite end and through the respective brake beam to which it may be releasably locked is rectangular in cross section, and, as shown in FIG. 2, is provided with a plurality of spaced-apart rabbet type grooves 29. Each of these grooves is of such depth that its peripheral bottom cylindrical surface constitutes a circle that is tangent to the two longer sides of that portion of the piston rod 28 that is rectangular in cross section (see FIG. 4).

As shown in FIGS. 2, 5 and 6, a sleeve 30, the outside periphery of which is substantially square, is disposed about the grooved portion of the piston rod 28 it being noted that the length of this sleeve is substantially less than the length of this grooved portion of piston rod 28. As best illustrated in FIGS. 2 and 5 of the drawings, the interior of the sleeve 30 is provided with two sets of diametrically-arranged spaced-apart inwardly extending extending chordal ribs or tongues 31 which, while the sleeve 30 occupies the position shown in FIG. 2, extend into corresponding grooves 29.

As shown in FIGS. 2 and 6, the left-hand end of the sleeve 30 is provided with an outturned flange 32 in which, as best shown in FIG. 6, is formed a groove 33 that extends through an arc of substantially 90°. A pin 34 having its upper end anchored in a bore 35 provided in the upper horizontally extending flange of the brake beam 3 extends into the groove 33 to limit rotation of the sleeve 30 relative to the piston rod 28 through an arc of 90°.

As shown in FIG. 2 of the drawings, the web portion of the brake beam 3 is provided with an opening 36 which, as shown in FIG. 4, has a pair of opposed parallel planar sides. The left-hand end of this opening 36, as shown in FIG. 2, is flared outwardly as indicated by the numeral 37. As shown in FIGS. 4, 5 and 6, the upper and lower horizontally extending flanges of the brake beams 3 and 4 are connected by a web 38 cast integral with this brake beam. Formed in this web 38 is an opening 39 which is concentric with the opening 36, it being understood that the right-hand end of the opening 36 opens into the left-hand end of the larger opening 39 as is apparent in FIG. 2. This opening 39 is substantially square in cross section.

As shown in FIGS. 2 and 4, a sleeve 40 conforming in cross section to the opening 36 is disposed therein. As shown in FIG. 2, the right-hand end of this sleeve 40 is provided with an outturned flange 41 which is disposed within the opening 39 intermediate the ends thereof. As also shown in FIG. 2, disposed between the outturned flange 41 and the left-hand end of the opening 39 is a first resilient member 42, it being understood that the outer periphery of this member 42 is substantially square and that it is provided with an opening 43 having the same shape as the opening 36 for receiving therein the sleeve 40.

Disposed in the opening 39 on the right-hand side of the outturned flange 32 of the sleeve 30 is a second resilient member 44 the outer periphery of which is substantially square in cross section and which is substantially the same size as the opening 39. This resilient member 44 is provided with a substantially square opening 45 through which the square sleeve 30 extends, as shown in FIG. 5.

The two resilient members 42 and 44 and the sleeves 30 and 40, the respective flanges 32 and 41 of which are disposed between these resilient members, are retained in the respective brake beam between the upper and lower horizontally extending flanges thereof by an annular plate 46 that, as shown in FIGS. 1, 2 and 3, is secured to the brake beam by a plurality of cap screws 47.

Now let it be supposed that while the brakes are applied, the brake shoes 12 wear away. Consequently, in response to this wear, each brake cylinder 7 and its corresponding diaphragm piston 23 must move in opposite directions a greater distance than when no wear occurred to insure that the braking surface of the brake shoes 12 carried by the respective brake beams remain in contact with the corresponding wheels. This wearing away of the brake shoes 12 causes the distance between the braking surface of each brake shoe and the tread surface of the corresponding wheel to become greater than normal while the brake beams and brake shoes occupy their brake release position. Consequently, after the occurrence of a chosen amount of brake shoe wear, this wear may be compensated for by increasing the length of the piston rods 28 which may be accomplished in the following manner:

Assuming that the brakes are released, a mechanic will apply a wrench to the square periphery of the sleeve 30 shown in FIG. 1 on the left-hand side of the truck bolster 5 and thereafter exert a force on the wrench to effect clockwise rotation, as viewed in FIGS. 5 and 6, of this sleeve 30 through an angle of 90°. Since the member 44 is constructed of a resilient material such as, for example, rubber, this member 44 will be distorted or the material of which it is constructed will flow sufficiently to permit this amount of rotation which is limited by the length of the groove 33 in the outturned flange 32 of the sleeve 30.

As the sleeve 30 is thus rotated clockwise, as viewed in FIGS. 5 and 6, the tongues 31 that are integral with this sleeve are likewise rotated therewith from the position in which they are shown in FIG. 5 in which these tongues 31 are disposed in corresponding grooves 29 formed in the piston rod 28 through an angle of 90° to a position in which these tongues 31 are disposed entirely outside of the corresponding grooves 29.

Subsequent to the above-described rotation of the sleeve 30 to the position in which the tongues 31 are disposed outside of the corresponding grooves 29, the brake beam 3 can be manually moved relative to the piston rod 28 extending from the brake cylinder 7 carried by the brake beam 4 in the direction of the left hand, as viewed in FIG. 1, until the proper clearance between the braking surface of the brake shoes 12 carried by this brake beam 3 and the tread surface of the corresponding wheels 1 and 2 is obtained.

Now, while the brake beam 3 occupies the position to provide the proper brake shoe clearance for the brake shoes 12 carried by this brake beam 3, the mechanic will release the manual force he has been exerting on the wrench. Upon release of this force, the inherent resiliency of the resilient member 44 will cause this member to return to the position in which it is shown in FIG. 5. Accordingly, it will be understood that as the resilient member 44 is thus returned from its distorted position to the position in which it is shown in FIG. 5, it is effective to rotate the sleeve 30 counterclockwise, as viewed in FIGS. 5 and 6, until the pin 34 abuts the upper end of the groove 33 in the outturned flange 32, or, in other words, until this flange 32 and the sleeve 30 occupy the position in which they are shown in the drawings. As the sleeve 30 is thus rotated counterclockwise to the position in which it is shown in the drawings, each tongue 31, which is integral with the sleeve 30, will move into a corresponding groove 29 in the lower piston rod 28 shown in FIG. 1. Thus, this piston rod 28 is relocked to the brake beam 3 it being noted that each tongue 31 is now disposed in a corresponding groove 29 which is different than that groove in which it was disposed prior to the above-described unlocking and relocking operation.

Now the upper piston rod 28 shown in FIG. 1 can be unlocked from the brake beam 4 in the same manner as hereinbefore-described for effecting unlocking of the lower piston rod 28 from the brake beam 3.

Thereafter, the brake beam 4 can be manually moved in the direction of the right hand, as viewed in FIG. 1, until the proper clearance between the braking surface of the brake shoes 12 carried by this brake beam 4 and the tread surface of the corresponding wheels 1 and 2 is obtained, after which relocking of the upper piston rod 28 to the brake beam 4 is effected in the manner hereinbefore described.

Having now described the invention, what we claim as new and desire to secure by Letters Patent, is:

1. A brake rigging for a four-wheel type of railway vehicle truck having a transverse axis and a longitudinal axis perpendicular thereto, wherein the improvement comprises the combination of:
   (a) two brake beams extending in spaced substantially parallel relation to the transverse axis of the vehicle truck, and guidably supported at the ends thereof on the truck for bodily movement longitudinally of the trucks,
   (b) a pair of brake cylinders each having a brake cylinder casing secured to one of said brake beams, said casings being on opposite sides of and in symmetrically spaced relation to the longitudinal axis of the truck along the length of said brake beams,
   (c) a pair of diaphragm pistons operable respectively in a corresponding one of said brake cylinder casings and having its outer periphery secured thereto,
   (d) a pair of piston rods one end of each of which is coaxially connected to its corresponding brake cylinder diaphragm piston and the other end portion being generally circular in cross section with parallel flat sides and a succession of spaced grooves extending between said flat sides,
   (e) a pair of sleeves each closely disposed about the said other end portion of its corresponding said piston rod and provided with two sets of diametrically-arranged spaced-apart inwardly extending chordal ribs cooperatively meshing with the grooves in said rod, and
   (f) a pair of resilient means each operatively connecting a corresponding one of said sleeves to the corresponding brake beam so as to provide for limited rotary movement of said sleeve in one direction relative to said corresponding brake beam to effect movement of said chordal ribs out of mesh with said grooves thereby to enable subsequent longitudinal movement of said corresponding brake beam relative to said piston rod, said resilient means being effective upon release of force applied to rotate said sleeve in said one direction, to rotate it in an opposite direction so as to move said sets of chordal ribs back into mesh with different grooves in said piston rod thereby varying the length of said rod and correspondingly the spacing between said beams.

2. Slack adjusting mechanism for railway truck brake rigging of the type in which two substantially parallel brakeshoe-carrying brake beams are operatively connected by means of brake cylinders carried on the brake beams and by the respective pistons and piston rods of said brake cylinders connected to the brake beam opposite that carrying the brake cylinder, wherein the improvement comprises the combination of:
   (a) a piston rod one end of which is coaxially connected to its brake cylinder piston and the other end portion being circular with parallel flat sides and a succession of spaced grooves extending between said flat sides,
   (b) a sleeve disposed about the said other end portion of said piston rod and provided with two sets of diametrically-arranged spaced-apart inwardly extending chordal ribs cooperatively meshing with the grooves in said rod, and (c) resilient means operatively connecting said sleeve to the corresponding brake beam so as to provide for limited rotary movement of said sleeve in one direction relative to said corresponding brake beam to effect movement of said chordal ribs out of mesh with said grooves thereby to enable subsequent longitudinal movement of said corresponding brake beam relative to said piston rod, said resilient means being effective upon release of force applied to rotate said sleeve in said one direction, to rotate it in an opposite direction so as to move said sets of chordal ribs back into mesh with different grooves in said piston rod thereby varying the length of said rod and correspondingly the spacing between said beams.

3. A slack adjusting mechanism, as claimed in claim 2, further characterized in that said grooves in said rod are of such depth that the cylindrical surface forming the bottom thereof coincides with a circle that is tangent to the flat sides of the end portions of said rod.

4. A slack adjusting mechanism, as claimed in claim 2, further characterized in that the length of said sleeve is substantially less than the length of the grooved end portion of said rod.

5. A slack adjusting mechanism, as claimed in claim 2, further characterized in that said resilient means constitutes a sleeve member the outer and inner peripheries of which are substantially square in contour.

6. A slack adjusting mechanism, as claimed in claim 2, further characterized in that the outer surface of said sleeve is polygonal to receive a tool for effecting manual rotation of said sleeve in said one direction.

7. A slack adjusting mechanism, as claimed in claim 6, further characterized in that said resilient means is provided with an opening extending therethrough which in cross section conforms to the polygonal outer surface of said sleeve.

8. A slack adjusting mechanism, as claimed in claim 2, further characterized in that said sleeve has formed integral therewith an outturned flange in which is provided an arcuate groove, and in that a pin anchored at one end in said corresponding brake beam extends into said groove whereby said pin and groove cooperate to limit rotation of said sleeve.

9. A slack adjusting mechanism, as claimed in claim 8, further characterized in that the length of said arcuate groove is such as to subtend an angle of approximately 90°.

10. A slack adjusting mechanism, as claimed in claim 8, further characterized in that said resilient means is disposed on one side of said outturned flange integral with said sleeve, and in that a second resilient means is disposed on the opposite side of said flange, the first said resilient means being effective to absorb shock forces acting longitudinally on said piston rod in one direction, and said second resilient means being effective to absorb shock forces acting longitudinally on said piston rod in an opposite direction.

11. A slack adjusting mechanism, as claimed in claim 10, further characterized in that said two resilient means provide a connection between said rod and said corresponding brake beam enabling limited universal angular movement of one with respect to the other.

References Cited

UNITED STATES PATENTS 2,381,212   8/1945   Farmer _____ 188—197

GEORGE E. A. HALVOSA, Primary Examiner

U.S. Cl. X.R.

188—196, 197